(12) United States Patent
Oyamada

(10) Patent No.: US 9,025,922 B2
(45) Date of Patent: May 5, 2015

(54) OPTICAL FIBER AND METHOD FOR MANUFACTURING SILICA GLASS

(75) Inventor: Hiroshi Oyamada, Gunma (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 419 days.

(21) Appl. No.: 13/403,983

(22) Filed: Feb. 24, 2012

(65) Prior Publication Data

US 2012/0219260 A1 Aug. 30, 2012

(30) Foreign Application Priority Data

Feb. 28, 2011 (JP) .................................. 2011-042926

(51) Int. Cl.
 *G02B 6/02* (2006.01)
 *C03C 25/60* (2006.01)

(52) U.S. Cl.
 CPC ........... *C03C 25/607* (2013.01); *C03C 2201/21* (2013.01); *C03C 2201/22* (2013.01)

(58) Field of Classification Search
 None
 See application file for complete search history.

(56) References Cited

U.S. PATENT DOCUMENTS

| | | | |
|---|---|---|---|
| 8,020,411 B2* | 9/2011 | Moridaira et al. | 65/435 |
| 2004/0099015 A1* | 5/2004 | Leppert | 65/424 |
| 2006/0013546 A1* | 1/2006 | Kurusu et al. | 385/123 |
| 2010/0251775 A1 | 10/2010 | Regnier | |
| 2010/0294000 A1* | 11/2010 | Tognini et al. | 65/378 |

FOREIGN PATENT DOCUMENTS

| | | |
|---|---|---|
| CN | 101838114 A | 9/2010 |
| EP | 1 182 176 A1 | 2/2002 |
| JP | H2-144503 A | 6/1990 |
| JP | 2003-137580 A | 5/2003 |
| JP | 2005-181414 A | 7/2005 |
| JP | 2006-30655 A | 2/2006 |
| JP | 2006-084697 A | 3/2006 |
| JP | 3970692 B2 | 9/2007 |

OTHER PUBLICATIONS

First Office Action for Application No. 201210044387.1, issued by the State Intellectual Property Office of Peoples' Republic of China on Dec. 18, 2013.
"New Hydrogen Aging Loss Mechanism in the 1400 nm Window," K.H. Chang, D. Kalish and M.L. Pearsall; Proceedings OFC 99.
"Formation of Hydroxyl Due to Reaction of Hydrogen with Silica in Optical Finer Preforms," J. Stone, J.M. Wiesenfeld, D. Marcuse, C.A. Burrus and S. Yang; Apllied Physics Letters 47, No. 3, 328-330, Aug. 1, 1985.
Office Action for Japanese Patent Application No. 2012-018579, issued by the Japanese Patent Office on May 26, 2014.

\* cited by examiner

*Primary Examiner* — Tina Wong

(57) ABSTRACT

A method for manufacturing deuterium-treated silica glass includes exposing silica glass to a deuterium-containing atmosphere for a predetermined period of time to diffuse deuterium molecules within the silica glass, maintaining the silica glass at 40° C. or higher, and cooling the silica glass to room temperature. The silica glass is a silica glass-based optical fiber having a core made of silica glass, where the core is positioned at a center of the optical fiber and contains at least germanium, and a clad made of silica glass, where the clad surrounds the core and has a lower refractive index than the core. A surface of the silica glass is covered with a resin coating.

20 Claims, 9 Drawing Sheets

OPTICAL FIBER AND METHOD FOR MANUFACTURING SILICA GLASS

The contents of the following Japanese patent application is incorporated herein by reference:

No. 2011-042926 filed on Feb. 28, 2011.

BACKGROUND

1. Technical Field

The present invention relates to an optical fiber and a method for manufacturing silica glass. More particularly, the present invention relates to an optical fiber and a method for manufacturing silica glass that achieve low attenuation and are suitable for wavelength division multiplex (WDM) within the wavelength range of 1300 nm to 1625 nm.

2. Related Art

The widespread use of the Internet has been rapidly increasing the amount of information communicated. Therefore, it has been desired to improve the transmission capacity of optical fiber communication systems. Coarse wavelength division multiplexing (CWDM) is a technique for simultaneously transmitting a plurality of optical signals with different wavelengths within the wavelength range of 1300 nm to 1625 nm using the same fiber. This technique, in principle, achieves improved transmission capacity, which is equal to the result of multiplying the transmission capacity of single-wavelength transmission by the number of the wavelengths that enter at the same time. Here, a silica glass-based optical fiber is highly transparent at the wavelengths of 1300 nm to 1600 nm and generally has attenuation of 0.4 dB/km or less. The attenuation is dependent on the wavelength and is expressed by the following Expression 1, where $\alpha$ denotes the attenuation and $\lambda$ denotes the wavelength.

$$\alpha = \frac{A}{\lambda^4} + B + C(\lambda) \qquad \text{Expression 1}$$

In Expression 1, the first term on the right side denotes the Rayleigh scattering loss, the second term denotes the structural-imperfection-induced loss, and the third term denotes the absorption loss caused by metal impurities and OH groups.

A conventional silica glass-based optical fiber has a lot of OH groups mixed therein that have an absorption peak in the vicinity of the wavelength of 1383 nm. This makes it difficult to use the optical fiber for WDM transmission within the wavelength range of 1300 nm to 1625 nm. To address this issue, Patent Document 1 discloses a method of fabricating silica glass for an optical fiber having the smallest possible number of OH groups mixed therein and thereby achieving reduced absorption loss at 1383 nm. Furthermore, it is known that the attenuation of the silica glass-based optical fiber may increases in the vicinity of 1383 nm when hydrogen is diffused within the silica glass-based optical fiber (see Non-Patent Documents 1 and 2).

During the step of spinning an optical fiber base material into an optical fiber, the base material made of silica glass is exposed to high temperature and elongated with high tensile force. Here, it is believed that the base material is rapidly cooled down with its glass structure being broken to generate structural defects, which are generally represented by Expression 2 and referred to as non-bridging oxygen hole centers: NBOHCs).

Expression 2

Here, it is known that the concentration of the NBOHCs in the optical fiber is dependent on the tensile force and the cooling rate during the spinning step. It is also known that the concentration of NBOHCs increases as the tensile force or cooling rate increases during the spinning step.

Furthermore, it is known that hydrogen molecules, which are small, are easily diffused at room temperature within the glass structure of the silica glass of which the optical fiber is made. If hydrogen molecules are diffused within the silica glass, the hydrogen molecules react with NBOHCs to generate OH groups as shown by Expression 3. This results in absorption loss in the vicinity of 1383 nm.

Expression 3

To prevent such degradation in absorption loss of the optical fiber made of silica glass, the optical fiber may be exposed to a deuterium atmosphere. According to this method, instead of hydrogen, deuterium, which is an isotope of hydrogen, is diffused within the optical fiber to react with the NBOHCs as expressed in Expression 4.

$$\equiv\text{Si}-\text{O.}+\tfrac{1}{2}\text{D}_2 \rightarrow \equiv\text{Si}-\text{OD} \qquad \text{Expression 4}$$

If the NBOHC defects disappear in this way, hydrogen may later diffuse within the silica glass but does not cause the OH group-induced increase in absorption loss. This reaction easily proceeds at room temperature as disclosed in Patent Document 2. The generated OD groups do not have absorption loss in the wavelength range of 1300 nm to 1625 nm. Therefore, the attenuation in this wavelength range is hardly affected. Accordingly, the method using deuterium is effective in fabricating silica glass optical fibers with low attenuation.

In some occasions, however, the absorption loss may increase in the vicinity of the wavelength of 1400 nm after the deuterium treatment as shown in FIG. 1. It has been proved that this increase in absorption loss is unstable and is likely to decrease as the time elapses and ultimately substantially disappears as shown in FIG. 2. It, however, takes approximately two to three months until the increase in absorption loss disappears. Therefore, such an increase in absorption loss significantly hinders the optical fiber manufacturing. Here, FIG. 1 shows the relation between the wavelength and the absorption loss for an optical fiber that has been treated with deuterium and an untreated optical fiber. Curve 1 represents the attenuation spectrum of the optical fiber that has been treated with deuterium, and Curve 2 represents the attenuation spectrum of the untreated optical fiber. FIG. 2 shows the relation between the days that have elapsed and the absorption loss at the wavelength of 1400 nm.

Patent Document 3 introduces a hypothesis that the increase in absorption loss at the wavelength of 1400 nm may result from per-oxy linkages (POLs) in the silica glass. When silica glass base materials fabricated under the same conditions are spun into optical fibers, the amount of the increase in absorption loss may vary depending on the spinning conditions. It is, however, not clear how the spinning conditions are related to the amount of POLs generated. The increase in absorption loss at the wavelength of 1400 nm has thus not yet been clarified. Patent Document 3 discloses an optical fiber that achieves reduced increase in absorption loss at the wavelength of 1400 nm. This optical fiber is realized by a low-productivity method that involves a low drawing speed and requires manufacturing condition optimization based on electron spin resonance evaluation.

Patent Document 1: Japanese Patent 3970692
Patent Document 2: EP 1182176 B1
Patent Document 3: Japanese Patent Application Publication No. 2006-030655

Non-Patent Document 1: "New Hydrogen Aging Loss Mechanism in the 1400 nm Window," K. H. Chang, D. Kalish and M. L. Pearsall; Proceedings OFC 99.

Non-Patent Document 2: "Formation of Hydroxyl Due to Reaction of Hydrogen with Silica in Optical Finer Preforms," J. Stone, J. M. Wiesenfeld, D. Marcuse, C. A. Burrus and S. Yang; Apllied Physics Letters 47, No. 3, 328-330, 1 Aug. 1985.

In light of the above-described problems, an object of the present invention is to provide a method for manufacturing silica glass that can reduce the increase in absorption loss in the vicinity of the wavelength of 1400 nm that is caused by deuterium treatment and can efficiently fabricate a silica glass optical fiber having low attenuation in the wavelength range of 1300 nm to 1625 nm, and to provide such a silica glass optical fiber.

SUMMARY

Therefore, it is an object of an aspect of the innovations herein to provide a method for manufacturing silica glass and an optical fiber, which are capable of overcoming the above drawbacks accompanying the related art. The above and other objects can be achieved by combinations described in the claims.

According to the present invention, a method for manufacturing silica glass includes exposing silica glass to a deuterium-containing atmosphere for a predetermined period of time to diffuse deuterium molecules within the silica glass, maintaining the silica glass at 40° C. or higher, and cooling the silica glass to room temperature. The silica glass is a silica glass-based optical fiber in which a core made of silica glass is provided at a center thereof and contains at least germanium. The core is surrounded by a clad that is made of silica glass and has a lower refractive index than the core. The surface of the silica glass is covered with a resin coating.

The exposing deactivates a structure in the silica glass that has an absorption loss peak in the vicinity of the wavelength of 630 nm. Prior to the exposing, a first attenuation value is measured in the vicinity of the wavelength of 1383 nm. After the cooling, a second attenuation value is measured in the vicinity of the wavelength of 1383 nm. The increase from the first attenuation value to the second attenuation value is 0.005 dB/km or less.

The maintaining can also deactivate a structure within the silica glass that has an absorption loss peak in the vicinity of the wavelength of 1400 nm. Prior to the maintaining, a third attenuation value is measured at least in the vicinity of 630 nm. The third attenuation value is equal to or less than a reference value, which is a result of adding 3 dB/km to a value that is obtained through extrapolation for a wavelength of 630 nm using Expression 5 and optimal values for variables A and B in Expression 5, and the optimal values for the variables A and B are determined using attenuation values at a plurality of wavelengths from no less than 700 nm and no more than 1600 nm. Here, Expression 5 is $$\alpha = \frac{A}{\lambda^4} + B,$$

where $\lambda$ denotes a wavelength and $\alpha$ denotes attenuation. Alternatively, the reference value can be determined in advance based on values measured for a similar fiber.

During the exposing, a partial pressure of the deuterium in the deuterium-containing atmosphere is preferably 1 to 5 kPa.

The exposing is preferably performed in an atmosphere having a temperature of 40° C. or higher. The maintaining is preferably performed after an absorption loss peak is generated in the vicinity of the wavelength of 1383 nm and continues until the generated absorption loss peak is stabilized. The stabilization of the absorption loss peak may indicate that the absorption loss peak becomes equal to or less than 0.35 dB/km. Alternatively, the stabilization of the absorption loss peak may indicate that the absorption loss peak becomes equal to or less than 0.3 dB/km. The maintaining is performed in the air or within a deuterium-containing atmosphere. The method preferably further includes, after the maintaining or after the cooling, exposing the silica glass to a hydrogen-containing atmosphere. After the exposing the silica glass to the hydrogen-containing atmosphere, a fourth attenuation value of the silica glass in the vicinity of the wavelength of 1383 is measured. The fourth attenuation value is equal to or less than 0.35 dB/km.

According to the present invention, a silica glass-based optical fiber includes a core made of silica glass. The core is positioned at a center of the optical fiber and containing at least germanium. The core is surrounded by a clad made of silica glass. The clad has a lower refractive index than the core. The clad is surrounded by a resin coating. The optical fiber is obtained by exposing silica glass to a deuterium containing atmosphere for a predetermined period of time to diffuse deuterium molecules within the silica glass, maintaining the silica glass at 40° C. or higher, and cooling the silica glass to room temperature. The optical fiber is characterized in that the attenuation at the wavelength of 630 nm is 10 dB/km or lower, the attenuation at the wavelength of 1383 nm is 0.35 dB/km or lower, and the cut-off wavelength is 1260 nm or lower when measured for the optical fiber of 22 m. The clad may partially contain fluorine. The clad has a diameter of 125 μm, and the resin coating has a diameter of 250 μm. The attenuation is 1 dB/turn or lower when the optical fiber is wound around a cylindrical tube of 5 mm.

The summary clause does not necessarily describe all necessary features of the embodiments of the present invention. The present invention may also be a sub-combination of the features described above. The above and other features and advantages of the present invention will become more apparent from the following description of the embodiments taken in conjunction with the accompanying drawings.

DESCRIPTION OF EXEMPLARY EMBODIMENTS

Hereinafter, some embodiments of the present invention will be described. The embodiments do not limit the invention according to the claims, and all the combinations of the features described in the embodiments are not necessarily essential to means provided by aspects of the invention.

<Manufacturing of Optical Fiber Base Material>

SMP 1

Figure 1:
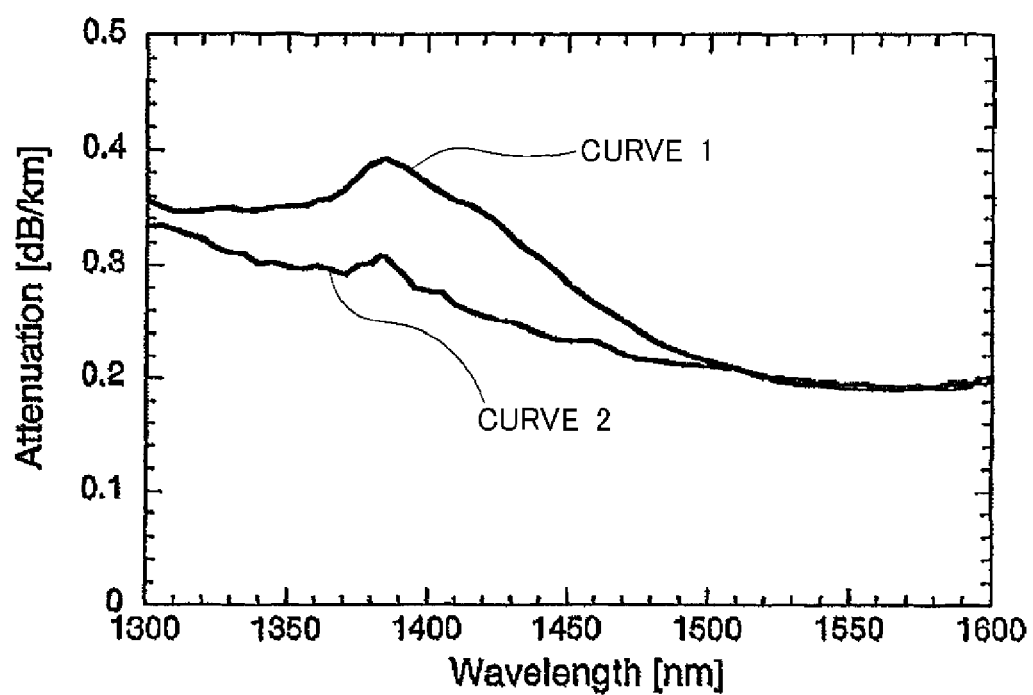
FIG. 1 is a graph showing the relation between the wavelength and the absorption loss for an optical fiber that has been treated with deuterium and an untreated optical fiber.
Figure 2:
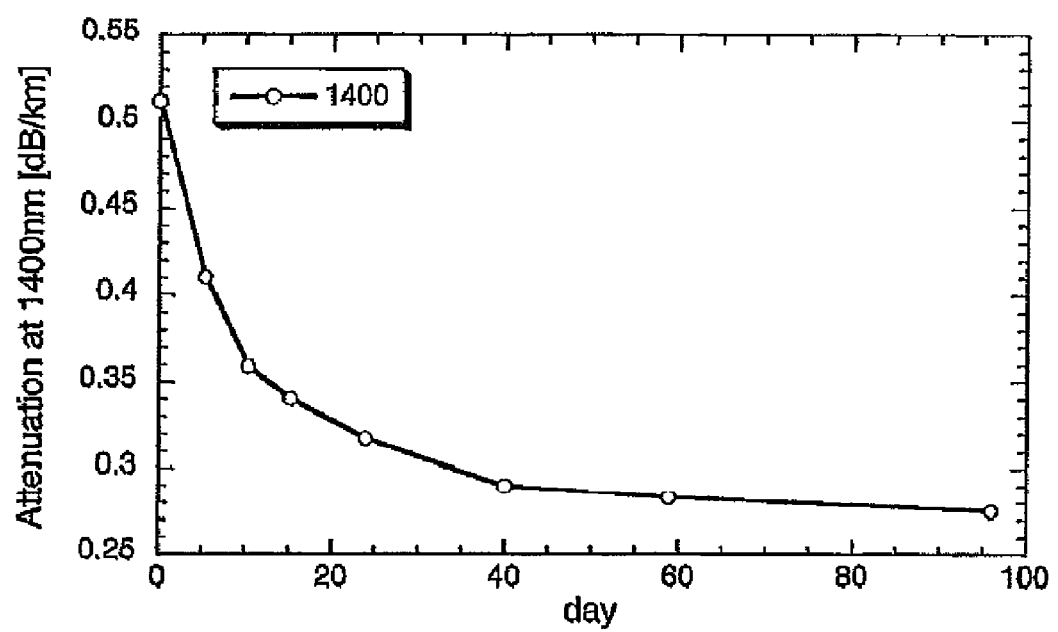
FIG. 2 is a graph showing the relation between the days that have elapsed and the absorption loss at the wavelength of 1400 nm.
Figure 3:
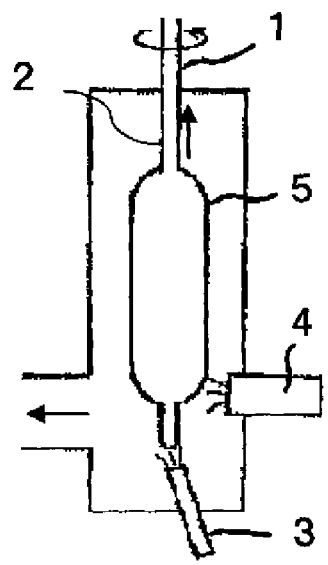
FIG. 3 is a schematic view illustrating a method for manufacturing a porous core base material.
Figure 4:
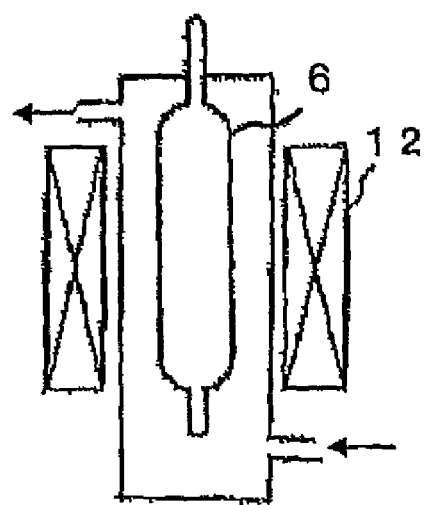
FIG. 4 is a schematic view illustrating dehydration and vitrification of a porous core base material.

A silica glass core base material is manufactured using VAD. A clad is deposited on the external surface of the core base material using OVD. In this way, a silica glass-based base material is formed. To begin with, a target material 2, which is attached to the end of a rotational axis 1, is rotated while silica glass soot containing Ge is sprayed onto the target material 2 from a burner 3 in order to increase the refractive index of a core portion. In addition, silica glass soot is sprayed from a burner 4 to form a silica glass clad portion. In this way, a porous core base material 5 is fabricated. The porous core base material 5 is thermally treated at the temperature of 1200° C. within a chlorine-containing atmosphere for dehydration. Furthermore, the porous core base material 5 is thermally treated at the temperature of 1500° C. within a dry helium atmosphere containing water of 1 ppm or less for vitrification. In this way, a transparent silica glass core base material 6 was fabricated. (See FIGS. 3 and 4.)

Figure 5:
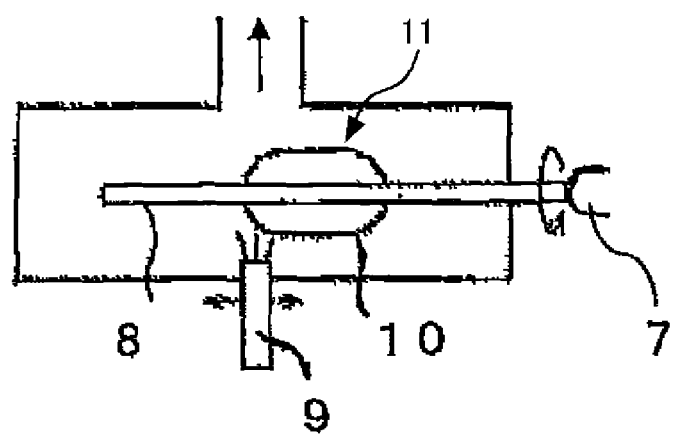
FIG. 5 is a schematic view illustrating a method for manufacturing a porous base material.

The core base material 6 is heated and elongated in such a manner that the outer diameter remains constant. In this way, a core base material 8 (a transparent silica glass core) is fabricated. The core base material 8 is attached to a rotational axis 7 and rotated with respect to the core of the core base material 8. Silica glass soot is sprayed onto the external surface of the core base material 8 from a burner 9 to deposit a porous silica glass layer. In this way, a porous base material 11 is fabricated that has the core base material 8 and a porous silica clad portion 10 integrated with each other (see FIG. 5). The porous base material 11 is thermally treated at the temperature of 1500° C. within a chlorine-containing atmosphere for dehydration and vitrification. In this way, a transparent silica glass base material is fabricated.

SMP 2

Figure 6:
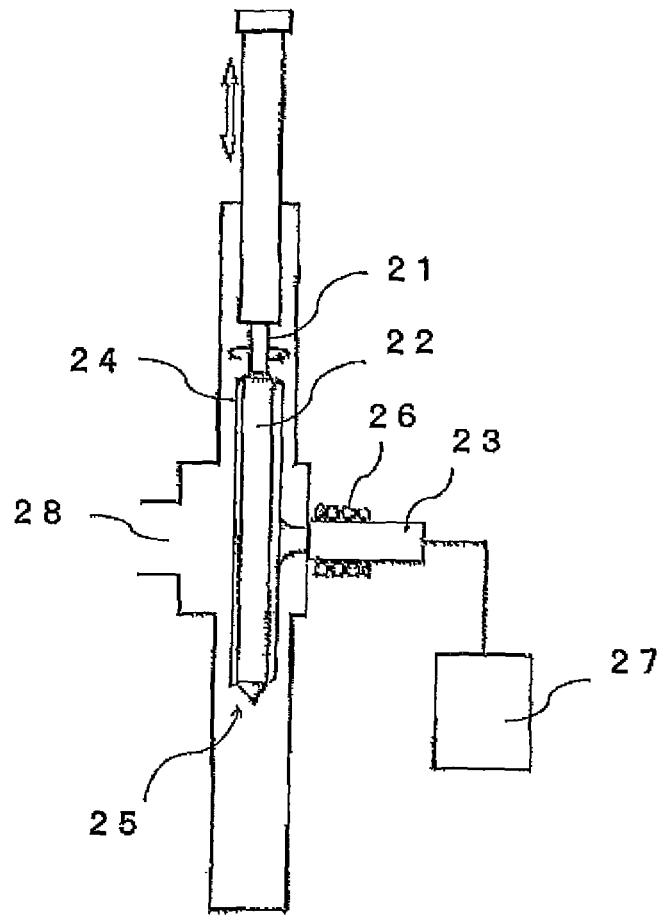
FIG. 6 is a schematic view illustrating a method for manufacturing a porous clad base material.

A silica glass core base material is manufactured using VAD. A first clad and a second clad are deposited onto the external surface of the core base material using OVD. In this way, a silica glass base material is fabricated. The silica glass base material is vitrified in the same manner as in SMP 1 to fabricate a transparent silica glass core base material. The transparent silica glass core base material is heated and elongated in such a manner that the outer diameter remains constant. In this way, a core base material 22 is fabricated. The core base material 22 is attached to a rotational axis 21 and rotated with respect to the core of the core base material 22 while silica glass soot containing F is sprayed onto the external surface of the core base material 22 from a burner 23 to deposit a first clad portion 24 made of silica glass. In this way, a first clad base material 25 is fabricated that has the core base material 22 and the first clad portion 24 integrated with each other (see FIG. 6). Furthermore, the first clad base material 25 is attached to a rotational axis and silica glass soot was sprayed onto the first clad base material 25 from a burner to deposit a porous silica glass clad portion. In this way, a porous base material is fabricated that has the first clad base material 25 and the silica glass clad portion integrated with each other. The porous base material is thermally treated at the temperature of 1500° C. within a chlorine-containing atmosphere for dehydration and vitrification. In this way, a transparent silica glass base material is fabricated. A manufacturing method involving spraying a gas containing fluorine may be a known method including, but not limited to, OVD, a plasma method or the like. In this embodiment, a conventional plasma apparatus is shown in FIG. 6 as an example. The method described in the above involves spraying silica glass soot containing fluorine from the burner 23. It is also possible to use a method according to which a quartz tube doped with fluorine may be arranged so as to surround a core base material and the quartz tube and the core base material may be integrated with each other.

<Manufacturing of Optical Fiber>

The transparent silica glass base materials manufactured in SMP 1 and SMP 2 are spun into silica glass optical fibers SMF 1 and SMF 2. The spinning is performed under such conditions that the temperature within the drawing furnace is set to 2000° C., the drawing speed is set to 1000 m/min, and the drawing tensile force is set to 250 g. The silica glass optical fibers have a diameter of 125 μm. Immediately after the spinning, the surfaces of the silica glass optical fibers were covered with ultraviolet curable acrylic resin. In this way, covered silica glass optical fibers having a diameter of 250 μm are fabricated.

<Deuterium Treatment of Optical Fiber>

Process 1

The silica glass optical fiber SMF 1 of 1.5 km is prepared and its attenuation is measured using the cutback technique. The result is shown as an initial attenuation spectrum 51 in FIGS. 7A and 7B. The fiber is left at room temperature for approximately one day within a nitrogen gas atmosphere containing deuterium of 5%. The total pressure of the atmosphere gas is set to approximately one atmospheric pressure. Accordingly, the partial pressure of the deuterium is approximately 5 kPa. After this, the fiber was left for approximately one day in the air. The attenuation of the fiber was measured, in total, two days after the timing before the deuterium treatment. The result is shown as a attenuation spectrum 52.

Figure 7A:
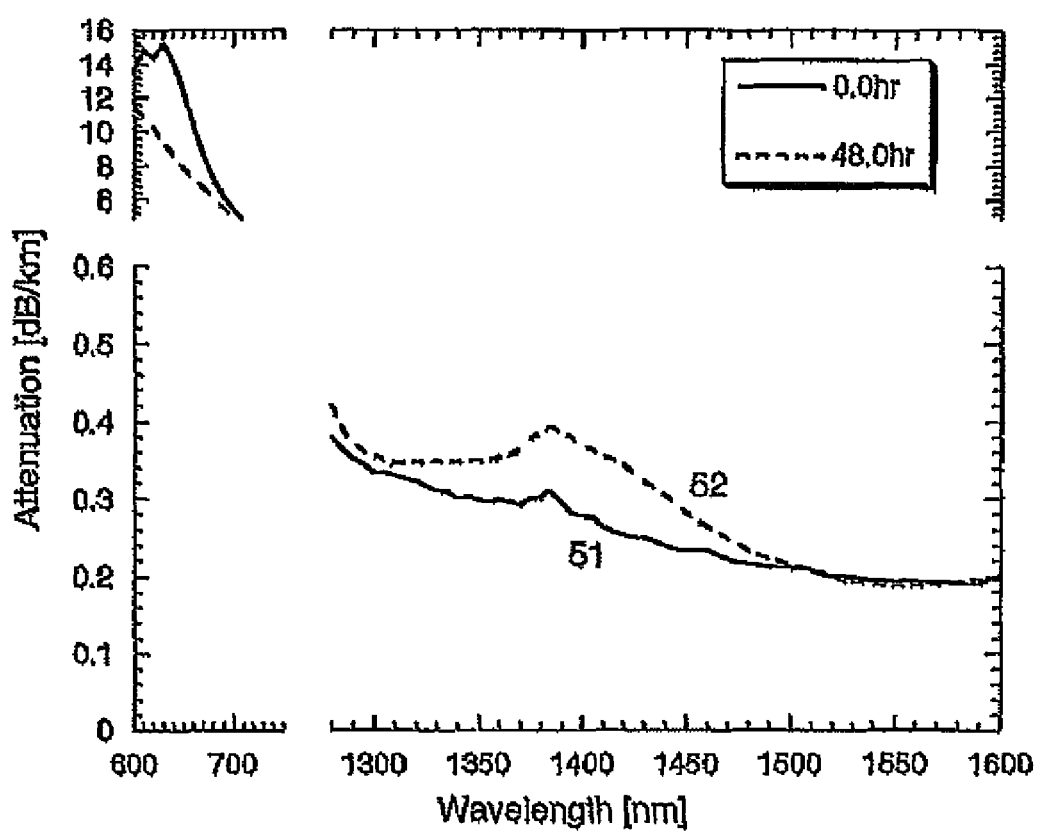
FIG. 7A is a graph illustrating an initial attenuation spectrum for an optical fiber SMF1 and showing, in an enlarged view, the values of attenuation in the low-attenuation range of 1300 nm or higher wavelengths.
Figure 7B:
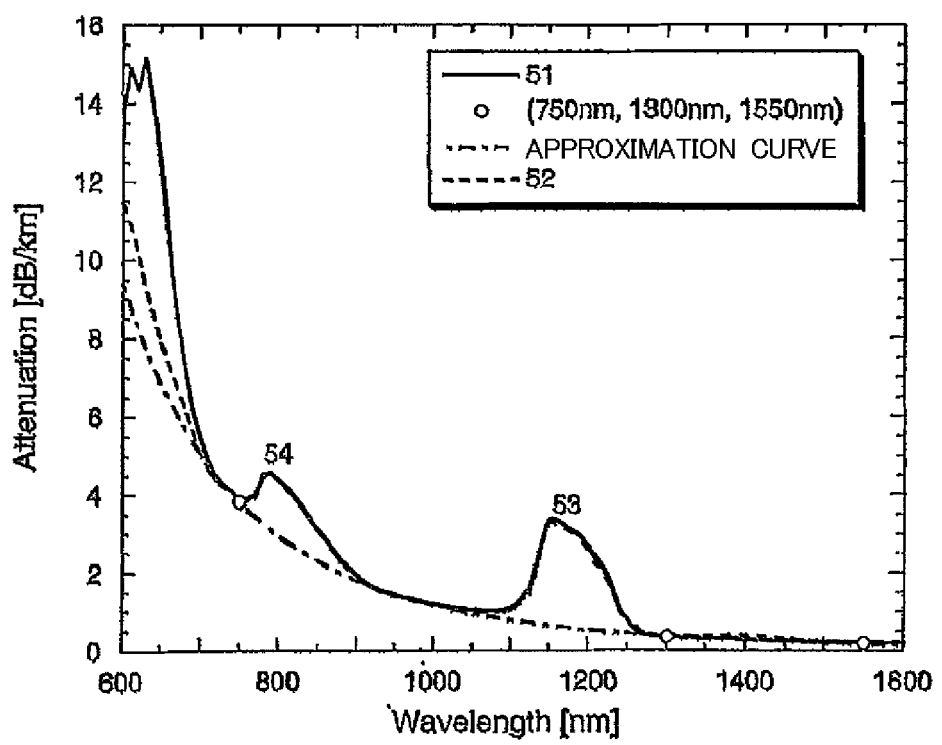
FIG. 7B is a graph illustrating an initial attenuation spectrum for the optical fiber SMF1 and showing the attenuation spectrum for the full range of wavelengths at which attenuation is measured.

As shown in FIG. 7A, the attenuation spectrum 51 indicates that the attenuation at the wavelength of 630 nm was 15.1 dB/km. FIG. 7B shows the attenuation spectrum within the full range of wavelengths at which the attenuation is measured. In FIG. 7B, peaks 53 and 54 are generated due to the change in the propagation wavelength range for the high-order modes before and after the measurement using the cutback technique, and not indicative of the intrinsic attenuation for the fundamental mode. According to the attenuation spectrum 51 shown in FIG. 7B, the values of the attenuation at the wavelengths of 750 nm, 1300 nm, and 1550 nm are respectively 3.8 dB/km, 0.35 dB/km, and 0.19 dB/km. Using these three values and least squares approximation, the variables A and B in Expression 5 are calculated. The results are A=1.23 and B=−0.05. Using these values of the variables A and B and Expression 5, the attenuation at the wavelength of 630 nm is extrapolated. The result is 7.7 dB/km. This clearly indicates that an absorption peak is present in the vicinity of 630 nm. It is known that such an absorption peak is caused by NBOHC defects. According to the attenuation spectrum 52, on the other hand, the attenuation at the wavelength of 630 nm is 9.3 dB/km. This reveals that the deuterium treatment eliminates almost all of the NBOHC defects. Here, the attenuation in the vicinity of 1400 nm increases by approximately 0.1 dB/km. It should be noted that the wavelength of 700 nm or longer is desirably used for approximation curve calculation since the absorption peak in the vicinity of 630 nm continues up to the vicinity of 700 nm. On the other hand, the wavelength of 1600 nm or shorter is desirably used for approximation curve calculation since it is known that the infrared absorption loss of silica glass becomes significant in the long wavelength range over 1600 nm. The wavelength used for approximation curve calculation is desirably selected to avoid the peaks resulting from the high-order modes such as the peaks 53, 54 in FIG. 7B.

Figure 8:
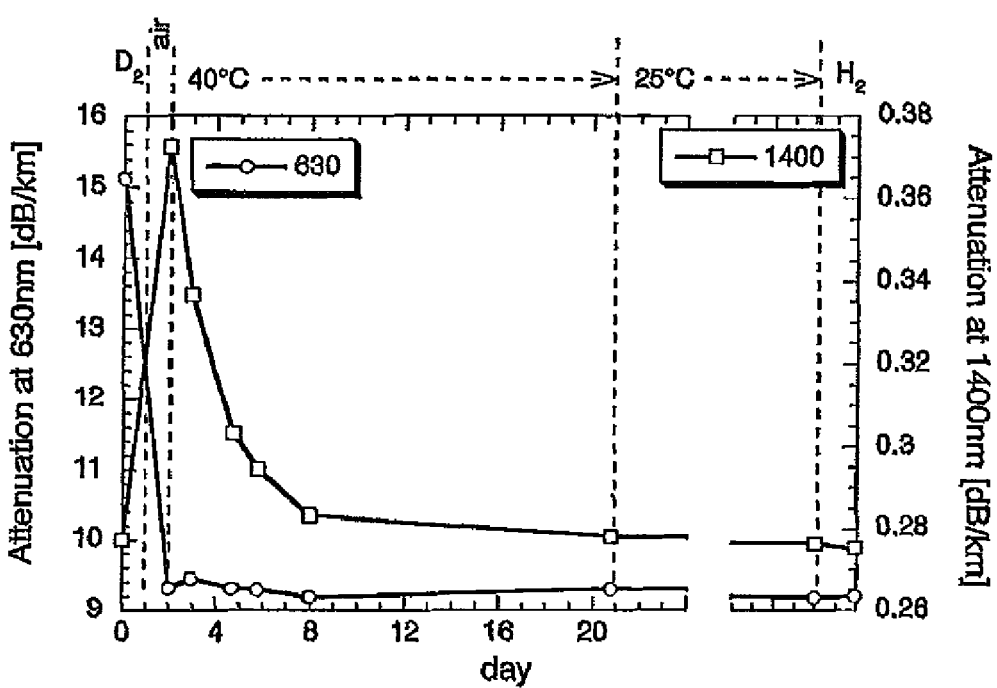
FIG. 8 is a graph illustrating how the attenuation of an optical fiber varies over time at the wavelengths of 630 nm and 1400 nm while the optical fiber is left in a high-temperature atmosphere at 40° C. after deuterium treatment.

After this, the same optical fiber is left in the air in a high-temperature atmosphere of 40° C. FIG. 8 shows the change, during this treatment, in attenuation over time at the wavelengths of 630 nm (the value of the attenuation is represented by the left vertical axis) and 1400 nm (the value of the attenuation is represented by the right vertical axis) was as shown in FIG. 8. Note that the value of the attenuation at the wavelength of 630 nm is represented by the left vertical axis and the value of the attenuation at the wavelength of 1400 nm is represented by the right vertical axis. The attenuation at 1400 nm gradually decrease and, eight days later (one day of the deuterium treatment+one day of being left in the air+six days of the high-temperature treatment), the increase in attenuation at 1400 nm becomes 0.01 dB/km or less, which allows the optical fiber to practically serve as a low-attenuation optical fiber. For confirmation, the high-temperature treatment is continued and it is confirmed that the attenuation substantially returns to the level before the deuterium treatment twenty-one days later.

After this, the same fiber is cooled at a room temperature of 25° C. and then exposed to hydrogen. This hydrogen treatment is performed under conditions determined in accordance with the specifications of IEC60793-2B1.3. The hydrogen treatment is performed at room temperature within an hydrogen atmosphere with a partial pressure of 1 kPa. The attenuation at the wavelength of 1383 nm is measured. The result is 0.304 dB/km before the hydrogen treatment and 0.304 dB/km after the hydrogen treatment. In other words, the deuterium treatment has deactivated the NBOHC defects and the subsequent hydrogen treatment thus does not increase OH groups.

Process 2

The silica glass optical fiber SMF 2 of 10 km is prepared and left for 24 hours at a temperature of 47° C. within a vessel containing a nitrogen gas atmosphere containing deuterium of 1%. The total pressure of the atmosphere gas is set to approximately one atmospheric pressure. Accordingly, the partial pressure of the deuterium is approximately 1 kPa. The atmosphere within the vessel is replaced with a nitrogen gas atmosphere and the optical fiber is left in the vessel for four hours. After this, the optical fiber is removed from the vessel and left in the air to be subjected to high-temperature treatment of 85° C. for ten hours. After this, the temperature is lowered to a room temperature of 25° C.

Figure 9:
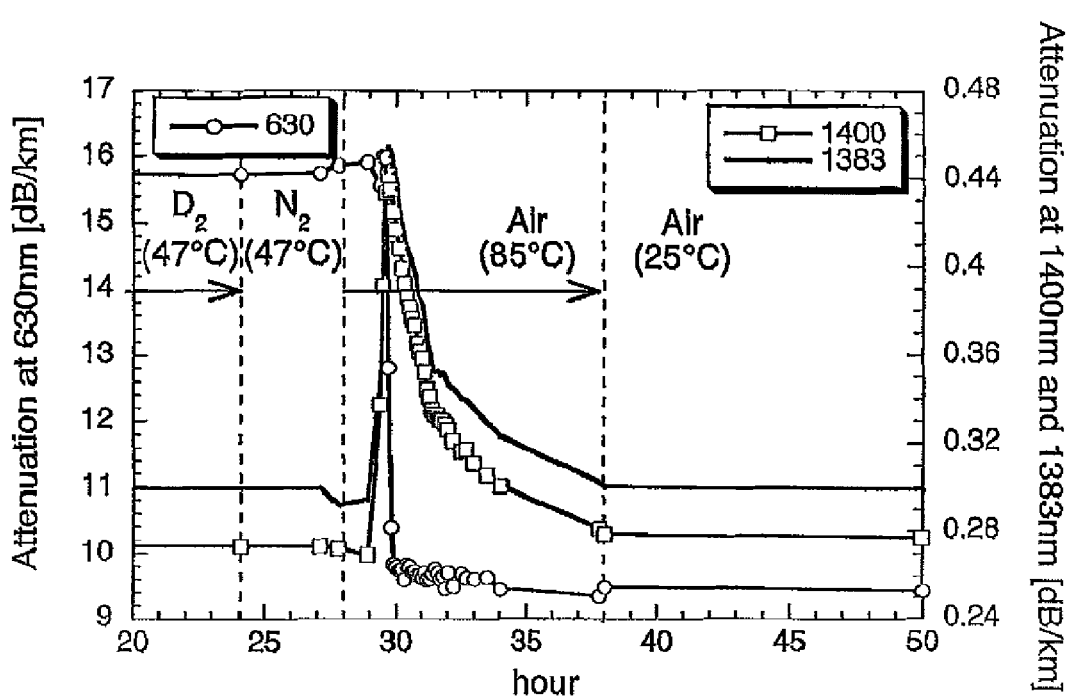
FIG. 9 is a graph illustrating how the attenuation of an optical fiber varies over time, where the optical fiber has been treated at a high temperature of 85° C. after deuterium treatment.

The change in attenuation over time is shown in FIG. 9. In FIG. 9, the values of the attenuation at 630 nm are represented by the left vertical axis, and the values of the attenuation at 1383 nm and 1400 nm are represented by the right vertical axis. The attenuation at 630 nm is initially 15.8 dB/km, which is higher than the attenuation of a fiber of the same type without NBOHC defects, specifically speaking, 10 dB/km or less, by 5 to 6 dB/km. The attenuation at 630 nm decreases to 9.6 dB/km approximately 30 hours after the start of the deuterium treatment. This proves that the NBOHC defects are bonded with deuterium and thus deactivated. The values of the attenuation at 1383 nm and 1400 nm are respectively 0.297 dB/km and 0.274 dB/km when measured before the start of the deuterium treatment. The values of the attenuation at 1383 nm and 1400 nm respectively increase to 0.454 dB/km and 0.442 dB/km approximately concurrently with the decrease in attenuation at 630 nm. This indicates that POLs or any other types of defects react with the deuterium.

After this, the values of the attenuation at 1383 nm and 1400 nm rapidly decrease and respectively reach 0.300 dB/km and 0.278 dB/km when the high-temperature treatment ends and the cooling step starts approximately 38 hours after the start of the deuterium treatment. Furthermore, sufficiently cooling the optical fiber to a room temperature of 25° C. sufficiently reduces the stress caused by the thermal expansion of the finer wound around a bobbin. When measured approximately 50 hours later, the values of the attenuation at 1383 nm and 1400 nm are respectively 0.299 dB/km and 0.277 dB/km. Accordingly, the increases from the values measured before the treatment are reduced to 0.005 dB/km or less. As a consequence, fiber with excellent characteristics are obtained.

While the embodiments of the present invention have been described, the technical scope of the invention is not limited to the above described embodiments. It is apparent to persons skilled in the art that various alterations and improvements can be added to the above-described embodiments. It is also apparent from the scope of the claims that the embodiments added with such alterations or improvements can be included in the technical scope of the invention.

The operations, procedures, steps, and stages of each process performed by an apparatus, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the process must be performed in this order.

As made clear from the above, the embodiments of the present invention can be used to realize a method for manufacturing silica glass that can reduce the increase in absorption loss of a silica glass optical fiber in the vicinity of the wavelength of 1400 nm resulting from deuterium treatment and can achieve low attenuation in the wavelength range of 1300 nm to 1625 nm and to realize such an optical fiber.

What is claimed is:

1. A method for manufacturing deuterium-treated silica glass, the method comprising:
   exposing silica glass to a deuterium-containing atmosphere for a predetermined period of time to diffuse deuterium molecules within the silica glass;
   during or after the exposing, maintaining the silica glass at 40° C. or higher; and,
   after the maintaining, cooling the silica glass to room temperature, wherein
   the silica glass is a silica glass-based optical fiber having:
   a core made of silica glass, the core being positioned at a center of the optical fiber and containing at least germanium; and a clad made of silica glass, the clad surrounding the core and having a lower refractive index than the core.

2. The method as set forth in claim 1, wherein
a surface of the silica glass is covered with a resin coating.

3. The method as set forth in claim 1, wherein
the exposing deactivates a structure in the silica glass that has an absorption loss peak in the vicinity of an wavelength of 630 nm.

4. The method as set forth in claim 1, wherein
the maintaining deactivates a structure within the silica glass that has an absorption loss peak in the vicinity of an wavelength of 1400 nm.

5. The method as set forth in claim 1, wherein
an increase from (i) a first attenuation value of the silica glass in the vicinity of a wavelength of 1383 nm before the exposing to (ii) a second attenuation value of the silica glass in the vicinity of the wavelength of 1383 nm after the cooling is 0.005 dB/km or less.

6. The method as set forth in claim 5, wherein
after the cooling, the second attenuation value of the silica glass in the vicinity of the wavelength of 1383 nm is measured.

7. The method as set forth in claim 6, wherein
a plurality of attenuation values are measured at a plurality of wavelengths from 700 nm to 1600 nm,
optimal values for variables A and B in Expression 5 are determined using the measured plurality of attenuation values,
an attenuation value for the wavelength of 630 nm is extrapolated using the optimal values for the variables A and B and Expression 5, and
a third attenuation value of the silica glass in the vicinity of the wavelength of 630 nm after the exposing and before the maintaining is higher than the extrapolated attenuation value for the wavelength of 630 nm, by 3 dB/km or less, and
Expression 5 is $$\alpha = \frac{A}{\lambda^4} + B,$$

where $\lambda$ denotes a wavelength and $\alpha$ denotes attenuation.

8. The method as set forth in claim 7, wherein
after the exposing and before the maintaining, the third attenuation value of the silica glass in the vicinity of a wavelength of 630 nm is measured.

9. The method as set forth in claim 8, wherein
after the exposing and before the maintaining, the third attenuation value of the silica glass in the vicinity of the wavelength of 630 nm is equal to or lower than a value determined in advance based on values measured for a similar fiber.

10. The method as set forth in claim 1, wherein during the exposing, a partial pressure of the deuterium in the deuterium-containing atmosphere is 1 to 5 kPa.

11. The method as set forth in claim 1, wherein
the exposing is performed in an atmosphere having a temperature of 40° C. or higher.

12. The method as set forth in claim 1, wherein
the maintaining is performed in the air.

13. The method as set forth in claim 1, wherein
the maintaining is performed within a deuterium-containing atmosphere.

14. The method as set forth in claim 1, wherein
the maintaining is performed after an absorption loss peak in the vicinity of a wavelength of 1383 nm is generated, and continues until the absorption loss peak is stabilized.

15. The method as set forth in claim 1, further comprising
after the maintaining or after the cooling, exposing the silica glass to a hydrogen-containing atmosphere.

16. The method as set forth in claim 15, wherein
after the exposing the silica glass to the hydrogen-containing atmosphere, a fourth attenuation value of the silica glass in the vicinity of a wavelength of 1383 nm is 0.35 dB/km or lower.

17. The method as set forth in claim 15, wherein
after the exposing the silica glass to the hydrogen-containing atmosphere, a fourth attenuation value of the silica glass in the vicinity of a wavelength of 1383 nm is measured.

18. A method for manufacturing deuterium-treated silica glass, the method comprising:
obtaining a first attenuation value of silica glass measured at a wavelength in the vicinity of 1383 nm;
after the obtaining, exposing the silica glass to a deuterium-containing atmosphere for a predetermined period of time to diffuse deuterium molecules within the silica glass;
during or after the exposing, maintaining the silica glass at 40° C. or higher;
after the maintaining, cooling the silica glass to room temperature; and,
after the cooling, measuring a second attenuation value of the silica glass at a wavelength in the vicinity of 1383 nm, wherein
an increase from the first attenuation value to the second attenuation value is 0.005 dB/km or less, and
a third attenuation value of the silica glass measured at a wavelength in the vicinity of 630 nm after the exposing and before the maintaining is higher than an extrapolated attenuation value for the wavelength of 630 nm by 3 dB/km or less, where the extrapolated attenuation value is extrapolated using optimal values for variables A and B in the expression $$\alpha = \frac{A}{\lambda^4} + B,$$

in which $\lambda$ denotes a wavelength and $\alpha$ denotes attenuation, the optimal values for variables A and B being determined using a plurality of measured attenuation values measured at a plurality of wavelengths from 700 nm to 1600 nm.

19. The method as set forth in claim 18, wherein
the obtaining includes measuring a first attenuation value of the silica glass at a wavelength in the vicinity of 1383 nm.

20. The method as set forth in claim 19, further comprising
measuring the plurality of measured attenuation values used to determine the optimal values for variables A and B.

* * * * *